United States Patent
Han et al.

(10) Patent No.: US 11,429,599 B2
(45) Date of Patent: Aug. 30, 2022

(54) METHOD AND APPARATUS FOR UPDATING DATABASE BY USING TWO-PHASE COMMIT DISTRIBUTED TRANSACTION

(71) Applicant: Beijing OceanBase Technology Co., Ltd., Beijing (CN)

(72) Inventors: Fusheng Han, Zhejiang (CN); Jinliang Xiao, Zhejiang (CN); Shanyan Gao, Zhejiang (CN); Chuanhui Yang, Zhejiang (CN); Yixin Luo, Zhejiang (CN)

(73) Assignee: Beijing OceanBase Technology Co., Ltd., Beijing (CN)

( * ) Notice: Subject to any disclaimer, the term of this patent is extended or adjusted under 35 U.S.C. 154(b) by 0 days.

(21) Appl. No.: 17/355,505

(22) Filed: Jun. 23, 2021

(65) Prior Publication Data
US 2022/0004542 A1 Jan. 6, 2022

(30) Foreign Application Priority Data
Jul. 2, 2020 (CN) .......................... 202010634228.1

(51) Int. Cl.
*G06F 16/23* (2019.01)
(52) U.S. Cl.
CPC ...... *G06F 16/2379* (2019.01); *G06F 16/2343* (2019.01)
(58) Field of Classification Search
CPC .. G06F 16/2343; G06F 16/2379; G06F 3/067; G06F 3/1774; G06F 3/2308; G06F 9/466; G06F 16/27; G06F 16/2322; G06F 16/2471
See application file for complete search history.

(56) References Cited

U.S. PATENT DOCUMENTS

| | | | |
|---|---|---|---|
| 7,284,018 B1 | 10/2007 | Waldorf et al. | |
| 2009/0292744 A1 | 11/2009 | Matsumura | |
| 2016/0364158 A1* | 12/2016 | Narayanan | G06F 3/067 |
| 2017/0308565 A1* | 10/2017 | Broll | G06F 16/2343 |
| 2021/0034605 A1* | 2/2021 | Cai | G06F 16/2379 |

FOREIGN PATENT DOCUMENTS

EP  0 567 999 A2  11/1993

OTHER PUBLICATIONS

Extended European Search Report in European Application No. 21180211.1, dated Nov. 30, 2021.
Wilson, A., "Distributed Transactions and Two-Phase Commit", SAP, Jan. 2, 2003, 39 pages.

* cited by examiner

*Primary Examiner* — Marcin R Filipczyk
(74) *Attorney, Agent, or Firm* — Finnegan, Henderson, Farabow, Garrett & Dunner, LLP

(57) ABSTRACT

Embodiments of the present specification provide a method for updating a database by using a two-phase commit distributed transaction. The method is applied to a coordinator, and includes: sending a first-phase prepare request message to each participant to end a current transaction, the current transaction being configured to update a target database record; and after receiving write lock advance release requests sent by all participants, returning a write lock advance release response to each participant to instruct each participant to unlock a target database record of the participant, the write lock advance release requests being sent by the participants after the participants successfully write a log of an update operation of the current transaction to a log buffer.

12 Claims, 9 Drawing Sheets

METHOD AND APPARATUS FOR UPDATING DATABASE BY USING TWO-PHASE COMMIT DISTRIBUTED TRANSACTION

CROSS-REFERENCE TO RELATED APPLICATIONS

The present application is based upon and claims priority to Chinese Patent Application No, 202010634228.1, filed on Jul. 2, 2020, the entire content of which is incorporated herein by reference.

TECHNICAL FIELD

The present specification relates to the field of network communication technologies, and in particular, to a method and an apparatus for updating a database by using a two-phase commit distributed transaction.

BACKGROUND

Transactions provide a mechanism, in which all operations involved in an activity can be incorporated into an indivisible execution unit. All Operations that make up a transaction can only be committed if all operations can be executed normally, A failure of any of these operations causes the entire transaction to abort. In distributed transactions, all parties participating in transaction processing are usually located on different network nodes, Two-phase commit (2PC) protocols are widely used to meet the atomicity, consistency, isolation, and durability (ACID) properties of the distributed transactions.

Large-scale websites often use distributed transactions to achieve high concurrent access to databases. In some application scenarios, such as in a "seckill" activity in online shopping, intensive updates to hot rows occur in a very short period of time. The performance of "seckill" is closely related to user experience. How to improve the concurrent performance of distributed transactions used to update hot rows has become particularly important.

SUMMARY

According to a first aspect of the present specification, a method for updating a database by using a two-phase commit distributed transaction is provided. The method is applied to a participant, and includes: performing an update operation according to an instruction on updating a target database record in a current transaction after adding a write lock to the target database record; using a second transaction, in a transaction information record, as a predecessor transaction of the current transaction, and recording the predecessor transaction of the current transaction in the transaction information record, wherein a state of the second transaction is to release the write lock in advance and an update object of the second transaction involves the target database record; writing a log of the update operation of the current transaction to a log buffer after receiving a first-phase prepare request message sent by a coordinator, and sending a write lock advance release request to the coordinator after the writing succeeds; releasing the write lock after receiving a write lock advance release response returned by the coordinator, and setting a state of the current transaction in the transaction information record to releasing the write lock in advance; after persisting the log of the update operation of the current transaction in the log buffer succeeds, performing one of: sending a first-phase prepare response message of preparation success to the coordinator after all predecessor transactions of the current transaction are in a commit state, or sending a first-phase prepare response message of preparation failure to the coordinator after any predecessor transaction of the current transaction is in an abort state; and setting the current transaction in the transaction information record to a commit state or an abort state based on an execution result of the current transaction in a second phase.

According to a second aspect of the present specification, a method for updating a database by using a two-phase commit distributed transaction is provided. The method is applied to a coordinator, and includes: sending a first-phase prepare request message to each participant to end a current transaction, the current transaction being configured to update a target database record; and after receiving write lock advance release requests sent by all participants, returning a write lock advance release response to each participant to instruct each participant to unlock a target database record of the participant, the write lock advance release requests being sent by the participants after the participants successfully write a log of an update operation of the current transaction to a log buffer.

According to a third aspect of the present specification, an apparatus for updating a database by using a two-phase commit distributed transaction is provided. The apparatus is applied to a participant, and includes: a processor; and a memory storing instructions executable by the processor, wherein the processor is configured to: perform an update operation according to an instruction on updating a target database record in a current transaction after adding a write lock to the target database record; use a second transaction, in a transaction information record, as a predecessor transaction of the current transaction, and record the predecessor transaction of the current transaction in the transaction information record, wherein a state of the second transaction is to release the write lock in advance and an update object of the second transaction involves the target database record; write a log of the update operation of the current transaction to a log buffer after receiving a first-phase prepare request message sent by a coordinator, and send a write lock advance release request to the coordinator after the writing succeeds; release the write lock after receiving a write lock advance release response returned by the coordinator, and set a state of the current transaction in the transaction information record to releasing the write lock in advance; after persisting the log of the update operation of the current transaction in the log buffer succeeds, perform one of: sending a first-phase prepare response message of preparation success to the coordinator after all predecessor transactions of the current transaction are in a commit state, or sending a first-phase prepare response message of preparation failure to the coordinator after any predecessor transaction of the current transaction is in an abort state; and set the current transaction in the transaction information record to a commit state or an abort state based on an execution result of the current transaction in a second phase.

According to a fourth aspect of the present specification, an apparatus for updating a database by using a two-phase commit distributed transaction is provided. The apparatus is applied to a coordinator, and includes: a processor; and a memory storing instructions executable by the processor, wherein the processor is configured to: send a first-phase prepare request message to each participant to end a current transaction, the current transaction being configured to update a target database record; and after receiving write lock advance release requests sent by all participants, return a write lock advance release response to each participant to instruct each participant to unlock a target database record of the participant, the write lock advance release requests being sent by the participants after the participants successfully write a log of an update operation of the current transaction to a log buffer.

The present specification also provides a non-transitory computer readable storage medium storing instructions that, when executed by a processor of a device, cause the device to perform the method for updating a database by using a two-phase commit distributed transaction according to the first aspect.

The present specification further provides a non-transitory computer readable storage medium storing instructions that, when executed by a processor of a device, cause the device to perform the method for updating a database by using a two-phase commit distributed transaction according to the first aspect.

In embodiments of the present specification, in the prepare phase in second-phase commitment, the participants send the write lock advance release requests to the coordinator after the log of the update operation is successfully written to the log buffer. After receiving the write lock advance release request from each participant of the distributed transaction, the coordinator returns the write lock advance release response, so that each participant releases the write lock in advance. In this way, a locking time of the target database record is greatly reduced, so that another transaction used to update the same target database record can be performed in advance, thereby improving the performance of concurrent processing. In addition, each participant maintains the state of the current transaction and the predecessor transaction of the current transaction in the transaction information record, and returns the first-phase prepare response message of preparation success or failure to the coordinator after the predecessor transaction is in the commit state or the abort state, thereby implementing the ACID properties of the distributed transaction.

DESCRIPTION OF IMPLEMENTATIONS

For a distributed transaction used to update a database record, referred to herein as a target database record, a coordinator initiates execution of a current transaction after determining several participants executing the current transaction. The coordinator sends an instruction on updating the target database record to each participant. For the participants, an execution process may include the following steps A1-A4.

Step A1: The participants parse an operation command of updating the database record, to generate an execution plan used to execute the operation command.

Step A2: Add a write lock to the target database record, and perform an update operation on the target database record according to the execution plan, where the update operation on the database record can be at least one of modification, deletion, or addition of a data item in the target database record, may be at least one of addition or deletion of an entry of the database record, or may be another operation that needs to be performed on the target database record in an exclusive way.

Figure 1:
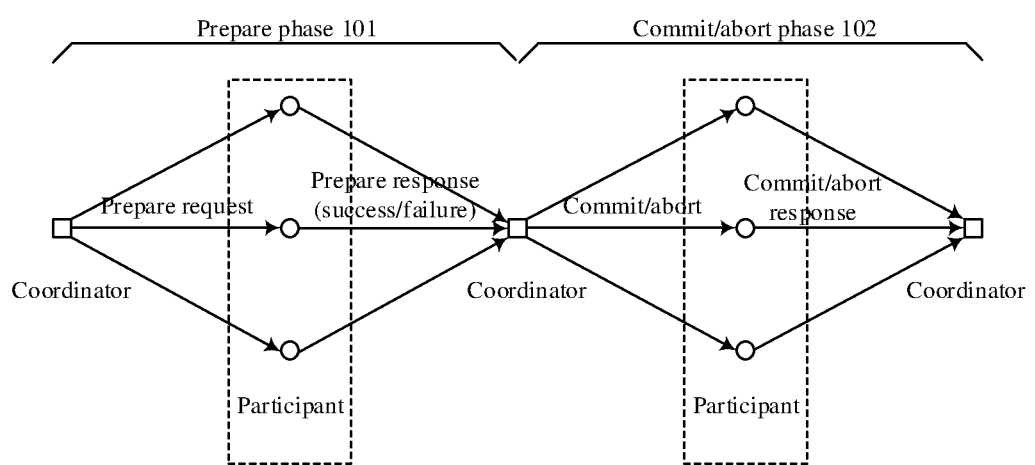
FIG. 1 is a schematic diagram illustrating an interactive procedure between a coordinator and a participant in a 2PC protocol, according to an embodiment.

When an initiator of the current transaction instructs the coordinator to end the transaction (e.g., when the initiator of the current transaction commits the current transaction, where the commitment herein is referred to as ending the transaction to distinguish from the phase 2 commitment in 2PC), the coordinator starts a procedure of 2PC, and sends a first-phase (referred to hereafter as "phase 1") prepare request message to each participant. 2PC is a type of distributed consensus protocol used to commit a transaction. The protocol includes two phases of operations: the first phase is the prepare phase 101, and the second phase is a commit/abort phase 102. An interactive procedure between a coordinator and a participant in the 2PC protocol is shown in FIG. 1.

For the participants, step A3: After receiving the phase 1 prepare request message, the participants write a log of the update operation to a log buffer.

Step A4: Persist the log of the update operation in the log buffer, that is, permanently store the log written to the log buffer on a medium. For example, a locally stored log file is to be written to a log file on a local hard drive. For another example, in a scenario in which a log file has a plurality of backup files, the log of the update operation in the log buffer is synchronized to the plurality of backup files. After the log persistence succeeds, the participants return phase 1 prepare response messages of preparation success (e.g., "Prepare OK") to the coordinator. If not all the operations in steps A1 to A3 are successfully performed or the log persistence fails, the participants return phase 1 prepare response messages of preparation failure (e.g., "Prepare No") to the coordinator. The participants perform two-phase commit or abort based on a commit or abort message sent by the coordinator in a second phase (referred to hereafter as "phase 2"), to write a commit or abort log of the current transaction.

After completing step A4, the participants unlock the target data record.

In the above four steps, a locking time of each participant for the target database record is from step A2 to step A4. The operations consuming the longest time are the log persistence in step A4 and a synchronization process performed when the transaction is ended according to the 2PC protocol.

Figure 2:
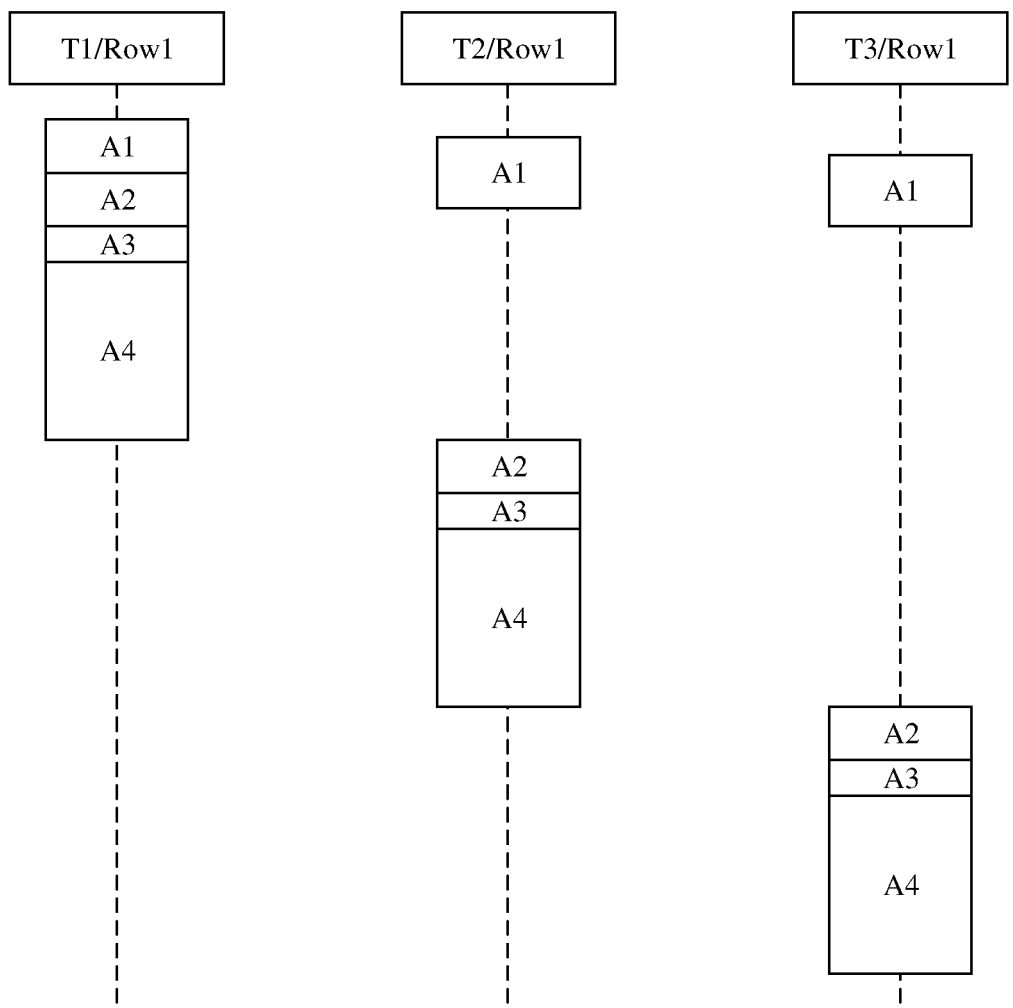
FIG. 2 is an example sequence diagram illustrating that participants concurrently update a database record according to an embodiment.

Especially for a large-scale website, a log file thereof usually has a plurality of backups, which are often located in different places such as cities. An inevitable transmission delay makes log persistence take a very long time. In a case of centralized and concurrent transactions used to update the same target database record, because steps A2 to A4 on a subsequent transaction can be performed only after the target database record is unlocked for a previous transaction, the performance is severely affected. Assuming that transactions T1, T2, and T3 are to use the same row Row1 in the database as an object of the update operation, an execution sequence at the maximum possible concurrency of T1, T2, and T3 is shown in FIG. 2.

Embodiments of the present specification provide a method for updating a database by using a two-phase commit distributed transaction. When participants execute phase 1 prepare request messages in the prepare phase, the participants send write lock advance release requests to a coordinator after successfully writing a log of an update operation to a log buffer in step A3. After receiving the write lock advance release requests from all the participants, the coordinator returns a write lock advance release response to each participant. The participants unlock a target database record based on the write lock advance release responses, and do not wait for log persistence in step A4 and the synchronization process in the 2PC protocol. Therefore, a locking time for the target database record is greatly shortened, and the performance of concurrent processing is improved. In addition, based on a state of a transaction of each participant that is maintained in a transaction information record, and dependency between a predecessor transaction and a successor transaction, the ACID properties of a distributed transaction is not affected when a transaction is aborted.

In the embodiments of the present specification, in a distributed system, a coordinator can communicate with one or more participants via a network. The coordinator or the participant can run on any device having a computing capability and a storage capability, such as a mobile phone, a tablet computer, a personal computer (PC), a notebook computer, or a server; or various functions of the coordinator or the participant can be implemented by logic nodes running on two or more devices. In addition, a coordinator and one or more participants can be located on the same physical device. This is not limited herein.

Figure 3:
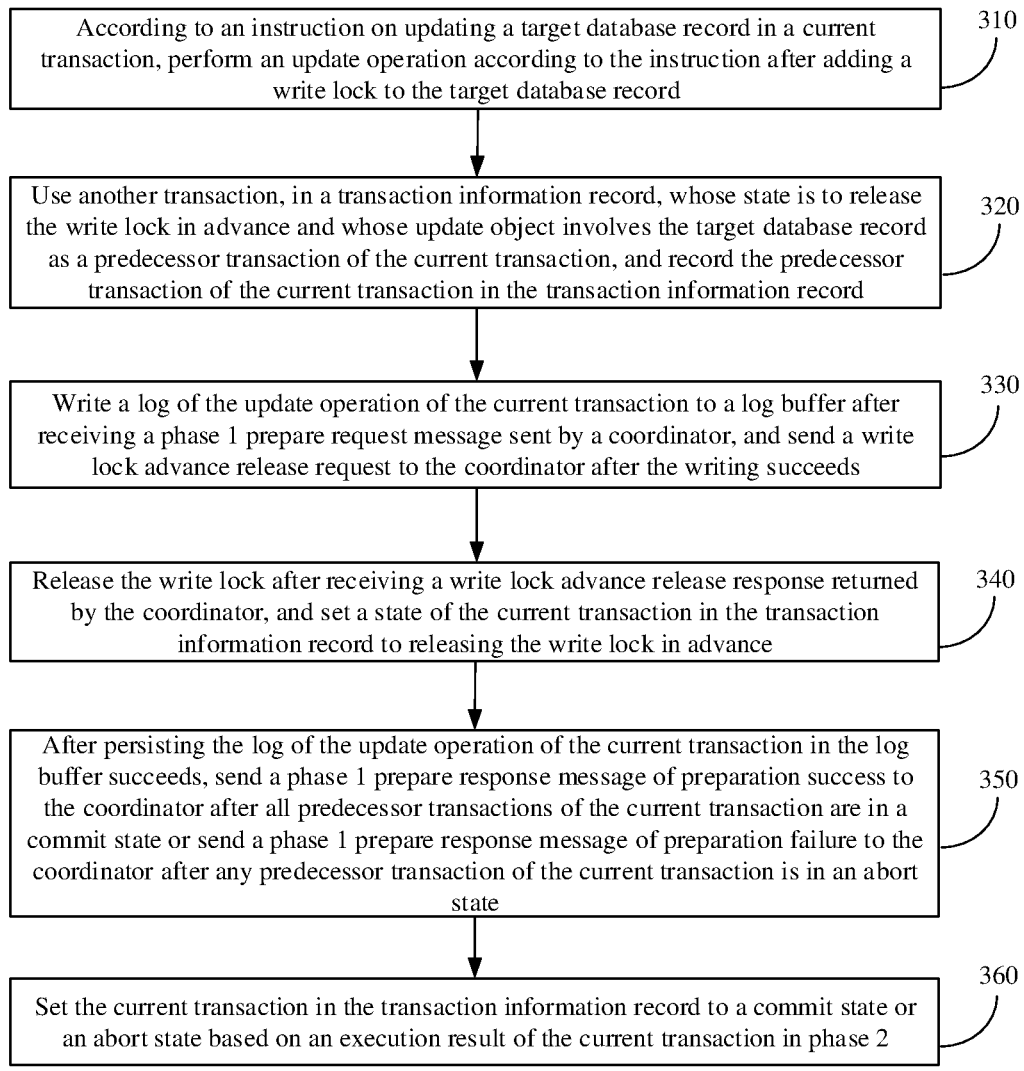
FIG. 3 is a flowchart illustrating a method, applied to a participant, for updating a database by using a two-phase commit distributed transaction according to an embodiment.
Figure 4:
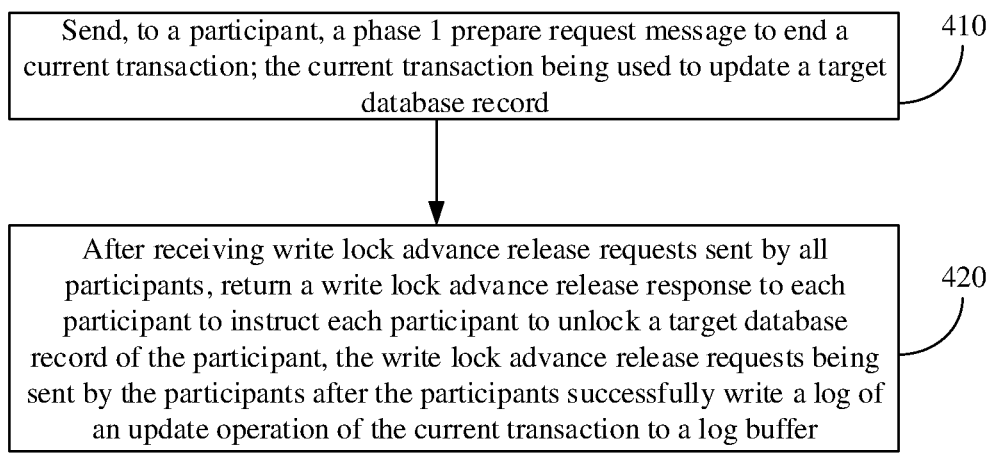
FIG. 4 is a flowchart illustrating a method, applied to a coordinator, for updating a database by using a two-phase commit distributed transaction according to an embodiment.

FIG. 3 is a flowchart of a method for a participant to update a database by using a 2PC distributed transaction according to an embodiment. FIG. 4 is a flowchart of a method for a coordinator to update a database by using a 2PC distributed transaction according to an embodiment. The distributed transaction is used to update a database record.

Referring to FIGS. 3 and 4, in step S310, according to an instruction on updating a target database record in a current transaction, the participant performs an update operation according to the instruction after adding a write lock to the target database record.

As described above, after initiating execution of the current transaction, the coordinator sends the instruction on updating the target database record to each participant. The participants determine a to-be-updated target database record according to the instruction, add the write lock to the target database record, and after the write lock is successfully added, perform, on the target database record, the update operation specified in the instruction.

For example, the database record can be a table, a page, a row, or the like in the database, or an entry or a combination of entries stored in another database. This is not limited herein.

In step S320, the participant uses another transaction, in a transaction information record, whose state is to release the write lock in advance and whose update object involves the target database record as a predecessor transaction of the current transaction, and records the predecessor transaction of the current transaction in the transaction information record.

In the embodiment, each participant maintains an independent transaction information record, which is configured to record various information of a distributed transaction executed by the participant, including but not limited to an identifier of the transaction, a status of the transaction, and the like. The status of the transaction includes an execution result (e.g., commit or abort) in phase 2, and can further include a prepare result (e.g., preparation success or preparation failure) in phase 1. The predecessor transaction of the current transaction is recorded in the transaction information record, and a state of releasing the write lock in advance is added to the status of the transaction.

When starting to execute a certain transaction, the participant writes information about the transaction to the transaction information record. In the embodiment, after determining the target database record according to the received instruction, the participant searches the transaction information record for another transaction whose update operation involves the target database record (that is, the database updated when the update operation is performed includes at least a part of the target database record) and whose state is to release the write lock in advance. If such a transaction is found, such a transaction is recorded in the transaction information record as a predecessor transaction of the current transaction. The current transaction is a successor transaction of each predecessor transaction. In some application scenarios, for each predecessor transaction of the current transaction, the current transaction can further be recorded in the transaction information record as a successor transaction of the predecessor transaction.

In the embodiments of the present specification, the current transaction can have one or more predecessor transactions or no predecessor transaction.

The write lock added to the target database record can be any lock that can prevent the update operation being performed by another transaction on the target database record, such as a mutex lock and an exclusive lock, which are collectively referred to as a write lock.

In step S410, the coordinator sends, to the participant, a phase 1 prepare request message to end the current transaction, the current transaction being configured to update the target database record.

For example, after receiving, from an initiator of the current transaction, the instruction on ending the transaction, the coordinator starts the 2PC protocol, and sends the phase 1 prepare request message of the current transaction to each participant.

In step S330, the participant writes a log of the update operation of the current transaction to a log buffer after receiving the phase 1 prepare request message sent by the coordinator, and sends a write lock advance release request to the coordinator after the writing succeeds.

If the participant fails to write the log of the update operation of the current transaction to the log buffer, the participant does not send the write lock advance release request to the coordinator.

In step S420, after receiving write lock advance release requests sent by all participants, the coordinator returns a write lock advance release response to each participant to instruct each participant to unlock a target database record of the participant, the write lock advance release requests being sent by the participants after the participants successfully write the log of the update operation of the current transaction to the log buffer.

In step S340, the participant releases the write lock after receiving a write lock advance release response returned by the coordinator, and sets a state of the current transaction in the transaction information record to releasing the write lock in advance.

In the embodiment, the coordinator receives the write lock advance release requests sent by the participants. For one transaction, if the coordinator has successfully collected write lock advance release requests sent by all participants of the transaction, the coordinator returns the write lock advance release response to each participant. The write lock advance release response is configured to instruct each participant of the transaction to unlock the target database record in advance, and the participant of the transaction does not need to unlock the target database record after step A4 is completed.

If the coordinator does not receive the write lock advance release requests sent by one or more participants, the coordinator does not perform processing.

If the participants receive the write lock advance release response sent by the coordinator, the participants unlock the target database record regardless of whether log persistence is completed, and record, in the transaction information record, the state of the current transaction as releasing the write lock in advance.

If the participants do not receive the write lock advance release request sent by the coordinator, the participants unlock the target database record after step A4 is completed.

In step S350, after persisting the log of the update operation of the current transaction in the log buffer succeeds, the participant sends a phase 1 prepare response message of preparation success to the coordinator after all predecessor transactions of the current transaction are in a commit state, or sends a phase 1 prepare response message of preparation failure to the coordinator after any predecessor transaction of the current transaction is in an abort state.

In the embodiment, after the persisting the log of the update operation in the log buffer is completed, if the current transaction has one or more predecessor transactions, the participant queries a state of each predecessor transaction in the transaction information record. The participant sends the phase 1 prepare response message of preparation success to the coordinator after all the predecessor transactions are in the commit state; or the participants sends the phase 1 prepare response message of preparation failure to the coordinator after any predecessor transaction is in the abort state.

If the current transaction has no predecessor transaction, the participant sends the phase 1 prepare response message of preparation success to the coordinator after the persisting the log of the update operation of the current transaction in the log buffer succeeds. If the participant fails in any one of steps A1 to A3 or the persisting the log of the update operation of the current transaction fails, the participant sends the phase 1 prepare response message of preparation failure to the coordinator.

In step S360, the participant sets the current transaction in the transaction information record to a commit state or an abort state based on an execution result of the current transaction in phase 2.

In the embodiment, in phase 2 (the commit/abort phase), if messages received by the coordinator from all the participants are phase 1 prepare response messages of preparation success, the coordinator sends a commit message to each participant. If any participant returns preparation failure, the coordinator sends an abort message to all the participants. The participants commit or abort the current transaction in phase 2 based on the commit message or the abort message received from the coordinator, and write the state of the current transaction in the transaction information record as a commit or abort state.

In the embodiment, after a transaction (denoted as transaction TA) releases the write lock in advance, another transaction (denoted as transaction TS) can add the write lock to the same target database record to perform an update operation. When transaction TS adds the write lock, if a state of transaction TA that is recorded in the transaction information record is to release the write lock in advance instead of the commit or abort state, it indicates that whether the update operation of transaction TA on the target database record is finally effective is still pending. If transaction TA is finally aborted, the target database record before being updated by using transaction TS is very likely to be incorrect (in other words, dirty data has been updated), and transaction TS also needs to be aborted. A success or failure of transaction TS depends on a final execution result of transaction TA. Therefore, in the implementation of the present specification, dependency between transaction TS and transaction TA is indicated by using transaction TA as a predecessor transaction of transaction TS and using transaction TS as a successor transaction of transaction TA, and the dependency is recorded in the transaction information record. Whether preparation of a successor transaction succeeds or fails is determined after a final state of a predecessor transaction of the successor transaction is determined, and then a phase 1 prepare response message is sent to a coordinator of the successor transaction.

The predecessor transaction is found by the successor transaction. For example, before performing the update operation on the target database record, the successor transaction searches the transaction information record for the predecessor transaction whose object of the update operation involves the target database record and whose state is to release the write lock in advance. The dependency between the successor transaction and the predecessor transaction is recorded in the transaction information record. After two-phase commitment/abortion on each transaction in 2PC is completed, the state of the current transaction is updated in the transaction information record. In this way, the successor transaction of the current transaction can determine to send the phase 1 prepare response message of preparation success or preparation failure to the coordinator in time.

In some application scenarios, various information about a transaction can be recorded by using an entry (for example, a row in a database table) of the transaction information record. In these application scenarios, after the successor transaction discovers the predecessor transaction of the current transaction, when the predecessor transaction of the current transaction is recorded in the transaction information record, each predecessor transaction and a status of each predecessor transaction can be recorded in an entry of the current transaction, and it is written in the entry of each predecessor transaction that the current transaction is the successor transaction of the predecessor transaction. When used to update the state of the current transaction in the transaction information record based on an execution result in the commit/abort phase, each transaction not only updates the state of the current transaction in the entry of the current transaction, but also updates the state of the current transaction in an entry of each successor transaction to a commit or abort state if the current transaction has a successor transaction. In this way, when waiting for a final state of the predecessor transaction, the successor transaction only needs to query the entry of the current transaction in the transaction information record, and does not need to repeatedly retrieve the entry of each predecessor transaction, thereby reducing resource occupation and accelerating a response speed.

In some embodiments, if the predecessor transaction consumes a relatively long time in step A4, there can be a plurality of layers of cascading successor transactions (where cascading means that the predecessor transaction of the current transaction is a successor transaction of another transaction). In practice, an operation that takes more time than a normal operation is more likely to fail. In this way, once a predecessor transaction having a plurality of layers of cascading successor transactions is aborted, all layers of successor transactions depending on the predecessor transaction need to be aborted. This may not only hinder improvement of the concurrent processing performance, but also affect the stability of the distributed system.

To reduce the possibility of the occurrence of the above situation, after receiving the write lock advance release requests sent by all the participants, the coordinator can generate a commit timestamp of the current transaction, and add the generated commit timestamp to the write lock advance release response for sending to each participant. The commit timestamp is configured to measure a start time of log persistence on the participants of the current transaction. The participants record the commit timestamp of the current transaction in the transaction information record. When the phase 1 prepare request message is executed, commit timestamps of all predecessor transactions of the successor transaction can be found in the transaction information record, and the probability of occurrence of a plurality of layers of cascading abortion can be reduced by using one or two of the following implementations:

In a first implementation, before the participants perform the update operation on the target database record according to the instruction, a difference between a timestamp of the current update operation and a commit timestamp of each predecessor transaction of the current transaction is calculated. If the difference between the timestamp of the current update operation and a commit timestamp of a certain predecessor transaction or commit timestamps of some predecessor transactions reaches or exceeds a first threshold, the participants perform the update operation according to the instruction after the predecessor transaction or these predecessor transactions are in the commit state or the abort state.

In a second implementation, before the participants write the log of the update operation of the current transaction to the log buffer, a difference between a timestamp of writing the log of the update operation of the current transaction to the log buffer and a commit timestamp of each predecessor transaction of the current transaction is calculated. If the difference between the timestamp and a commit timestamp of a certain predecessor transaction or commit timestamps of some predecessor transactions reaches or exceeds a second threshold, the participants write the log of the update operation of the current transaction to the log buffer after the predecessor transaction or these predecessor transactions are in the commit state or the abort state.

In the above two implementations, for a start time, measured by the commit timestamp, at which the participants perform log persistence, because an exact start time of each participant is different, the coordinator can use an approximate time as the commit timestamp, for example, can use a moment at which the coordinator receives the write lock advance release requests sent by all the participants as the commit timestamp, can use a moment at which the coordinator sends the write lock advance release response as the commit timestamp, or can use another moment as the commit timestamp. This is not limited herein. In an example, each participant can record the timestamp of writing the log of the update operation of the current transaction to the log buffer, and encapsulate the timestamp into the write lock advance release request for sending to the coordinator. After receiving the write lock advance release requests sent by all the participants, the coordinator uses the latest timestamp timestamps, all the write lock advance release requests, of writing the log of the update operation to the log buffer as the commit timestamp of the current transaction.

In addition, the first threshold and the second threshold can be determined with reference to factors such as duration required by log persistence in an actual application scenario and tolerance for cascading abortion. This is not limited herein. For example, in a scenario in which a log file has backups in different places, several times (for example, two to four times) a normal transmission delay between two places can be used as the first threshold or the second threshold.

In an embodiment, when a device on which the participant is located is restarted due to breakdown, in a recovery process, a status of a committed or aborted transaction can be recovered by using the log. For a transaction that has not been committed or aborted yet, the procedure in 2PC may be continued until the transaction is committed or aborted. In the recovery process, if the transaction that has not been committed or aborted yet has a predecessor transaction, an execution result of a successor transaction can only be determined with reference to a commit/abort state of the predecessor transaction. For a primary-secondary backup application scenario, the situation is similar after primary-secondary switching, To resolve a problem of data correctness in the recovery process, each participant can persist a state of the predecessor transaction of the current transaction in the transaction information record (for example, writing all predecessor transactions of the current transaction to the redo log) and a state of the current transaction. In this way, after the restart due to breakdown or the primary-secondary switching, the recovery process can be performed based on dependency between transactions and the state of the predecessor transaction. If the predecessor transaction is aborted, in the recovery process, the successor transaction can learn, from persisted information, that the predecessor transaction is aborted, and the current transaction is not committed based on dirty data.

In an embodiment, for a read-only transaction used to access the target database record, the read-only transaction can be enabled to read an update result of a committed transaction for the target database record, and update performed on the target database record by using the transaction that has not been committed or aborted yet is ignored. In this way, abortion of the read-only transaction can be avoided, facilitating the stability of the distributed system.

In the embodiments of the present specification, in the prepare phase, the participants send the write lock advance release requests to the coordinator after the log of the update operation is successfully written to the log buffer. After receiving the write lock advance release request from each participant of the distributed transaction, the coordinator returns the write lock advance release response, so that each participant releases the write lock in advance, and does not wait for the log persistence process. In this way, a locking time of the target database record is reduced, so that another transaction used to update the same target database record can be performed in advance, thereby improving the performance of concurrent processing. In addition, a state of a transaction of each participant and dependency between a predecessor transaction and a successor transaction are maintained in the transaction information record, so that the ACID properties of the distributed transaction are not affected when the transaction is aborted.

It should be noted that the actions or steps described can be performed in a different order and still can achieve desired results. In addition, the processes described in the accompanying drawings do not necessarily require the specific shown order or the sequential order to achieve the desired results. In some implementations, multitasking and parallel processing are also possible or can be advantageous.

Figure 5:
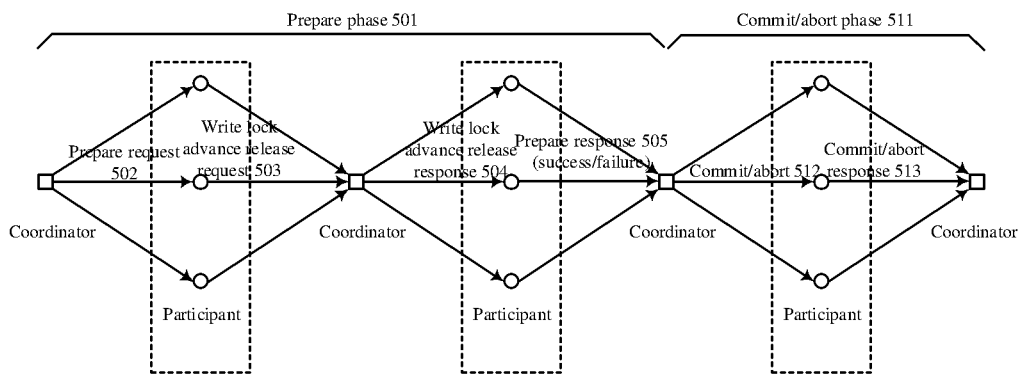
FIG. 5 is a schematic diagram illustrating an interactive procedure between a coordinator and a participant after ending of a transaction is initiated according to an embodiment.

In an application example of the present specification, a large-scale business website uses a distributed system to update a plurality of associated databases when deals occur. The "seckill" activity in online shopping poses a challenge to the concurrent update performance of a hot row in the database. The business website implements, based on the 2PC protocol by using the following method, a distributed transaction used to update the hot row. FIG. 5 is a schematic diagram of an interactive procedure between a coordinator and a participant after ending of a transaction is initiated, according to an embodiment.

For example, each participant maintains a transaction information registration table as a transaction information record. Each transaction in the transaction information registration table corresponds to a row of record. Data items of the row of record include: an identifier of the current transaction, a commit timestamp of the current transaction, an identifier of a predecessor transaction of the current transaction, a state of the predecessor transaction of the current transaction, an identifier of a successor transaction of the current transaction, and the like.

Also for example, a log file of the distributed transaction of the business website has three backup files, which are located in three different cities. The longest transmission delay between the three cities is 100 milliseconds (ms), In this application example, the first threshold and the second threshold are both set to 200 ms.

After the distributed transaction used to update the hot row is started, the coordinator sends an instruction on updating a target database record to each participant, where the instruction includes the identifier of the current transaction, and a database row to be updated by each participant and a specific update operation on this row are specified.

The participant receives the instruction on updating the target database record, and parses the to-be-updated target from the instruction. The participant queries the transaction information registration table maintained by the participant, and uses another transaction, in the transaction information registration table, whose state is to release the write lock in advance and whose update object is the target row as a predecessor transaction of the current transaction. The participant writes an entry (e.g., a row of record) of the current transaction to the transaction information registration table, where the entry includes the identifier of the current transaction, an identifier of each predecessor transaction of the current transaction, and a state (which currently is to release the write lock in advance) of each predecessor transaction; and writes the identifier of the current transaction to the entry of each predecessor transaction in the transaction information registration table as a successor transaction of the predecessor transaction.

The participant adds the write lock to the target row. The participant queries a commit timestamp of each predecessor transaction from the transaction information registration table, obtains a timestamp of the current update operation on the target row, and calculates a difference between the two timestamps. If the difference exceeds 200 ms, the participant pauses or waits. The participant performs the update operation on the target row after the predecessor transaction, in the transaction information registration table, with a difference exceeding 200 ms enters the commit or abort state. If none of the differences reaches 200 ms, the participant performs the update operation on the target row.

Referring to FIG. 5, in a prepare phase 501, after the instruction of the current transaction is ended, the coordinator sends a phase 1 prepare request message 502 of the current transaction to each participant.

The participants receive the phase 1 prepare request message of the current transaction, obtain the timestamp of writing the log of the current update operation to the log buffer, and calculate a difference between the timestamp of writing the log of the current update operation to the log buffer and the commit timestamp of each predecessor transaction. If the difference exceeds 200 ms, the participants pause or wait. The participants write the log of the current update operation to the log buffer after a predecessor transaction, in the transaction information registration table, with a difference exceeding 200 ms enters the commit or abort state. If none of the differences reaches 200 ms, the participants write the log of the current update operation to the log buffer.

After the log of the current update operation is successfully written to the log buffer, the participants encapsulate the timestamp of writing the log of the current update operation to the log buffer into the write lock advance release requests 503 for sending to the coordinator.

After receiving the write lock advance release requests 503 sent by all the participants, the coordinator uses the latest timestamp in timestamps, in all the write lock advance release requests, of writing the log of the update operation to the log buffer as the commit timestamp of the current transaction. The coordinator adds the commit timestamp of the current transaction to the write lock advance release response 504 for sending to each participant.

After receiving the write lock advance release response 504, the participants write the commit timestamp of the current transaction in the write lock advance release response 504 to the transaction information registration table, and unlock the write lock of the target row.

After successfully synchronizing the log of the update operation of the current transaction to three backup log files in the log buffer, the participants query a state of each predecessor transaction in the entry of the current transaction in the transaction information registration table, and send a phase 1 prepare response message 505 of preparation success to the coordinator after all predecessor transactions are in the commit state, or send a phase 1 prepare response message 505 of preparation failure to the coordinator after any predecessor transaction is in the abort state.

In a commit/abort phase 511, if messages received by the coordinator from all the participants are phase 1 prepare response messages of preparation success, the coordinator sends a commit message 512 to each participant. If any participant returns preparation failure, the coordinator sends an abort message 512 to all the participants. The participants commit or abort (513) the current transaction in phase 2 based on the commit message or the abort message 512 received from the coordinator, write the state of the current transaction in the transaction information record as a commit or abort state, and also write the state of the current transaction in an entry of the successor transaction of the current transaction as the commit or abort state.

The participants persist the state of the current transaction and the identifier of the predecessor transaction of the current transaction in the transaction information registration table into the log file, so that the data correctness in the recovery process after restart due to breakdown or primary-secondary switching can be ensured.

Figure 6:
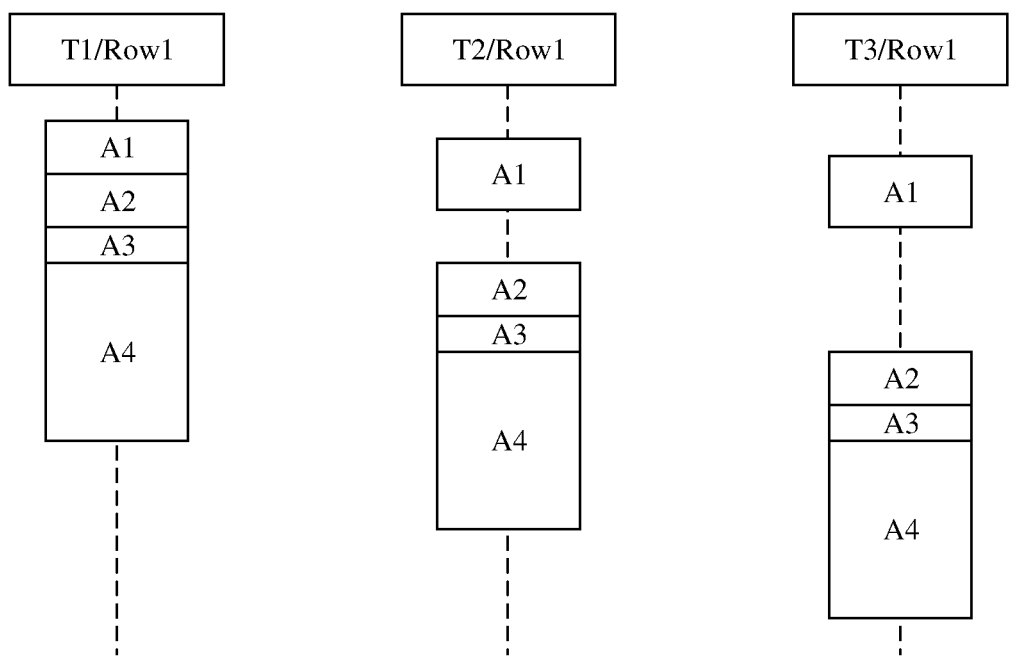
FIG. 6 is an example sequence diagram illustrating that participants concurrently update a database record according to an embodiment.

In this application example, assuming that transactions T1, T2, and T3 of a certain participant are to use the same row Row1 in the database as an object of the update operation, an execution sequence at the maximum possible concurrency of T1, T2, and T3 is shown in FIG. 6. It can be seen that the concurrency performance has been greatly improved compared with FIG. 2.

Figure 7:
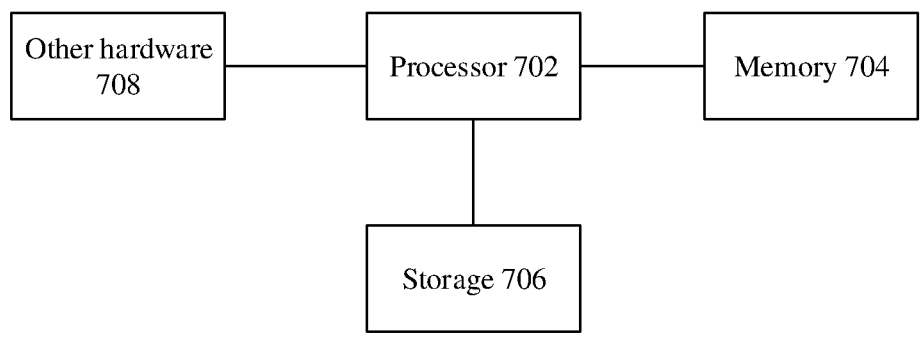
FIG. 7 is a schematic diagram of a device for updating a database by using a two-phase commit distributed transaction according to an embodiment.

FIG. 7 is a schematic diagram of a device for updating a database by using a two-phase commit distributed transaction according to an embodiment. For example, the device may operate as any of the initiator, the coordinator, or the participant described above. Referring to FIG. 7, the device includes a processor 702, such as a central processing unit (CPU), and a memory 704. The device may also include an external storage 706 and other hardware 708. The processor 702 is configured to execute instructions stored in the memory 704 to perform the above described methods.

Corresponding to the method embodiments, the present specification further provides an apparatus for a participant to update a database by using a two-phase commit distributed transaction and an apparatus for a coordinator to update a database by using a two-phase commit distributed transaction. Each unit in the two apparatuses can be implemented by software, hardware, or a combination of software and hardware.

Figure 8:
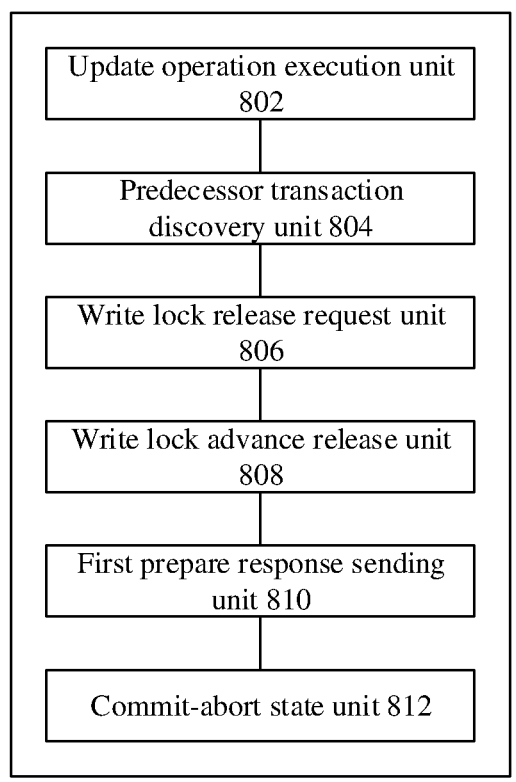
FIG. 8 is a schematic diagram of an apparatus, applied to a participant, for updating a database by using a two-phase commit distributed transaction according to an embodiment.

FIG. 8 is a schematic diagram of an apparatus for updating a database by using a two-phase commit distributed transaction according to an embodiment. The apparatus is applied to a participant, and includes: an update operation execution unit 802, a predecessor transaction discovery unit 804, a write lock release request unit 806, a write lock advance release unit 808, a first prepare response sending unit 810, and a commit-abort state unit 812.

The update operation execution unit 802 is configured to: according to an instruction on updating a target database record in a current transaction, perform an update operation according to the instruction after adding a write lock to the target database record. The predecessor transaction discovery unit 804 is configured to: use another transaction, in a transaction information record, whose state is to release the write lock in advance and whose update object involves the target database record as a predecessor transaction of the current transaction, and record the predecessor transaction of the current transaction in the transaction information record. The write lock release request unit 806 is configured to: write a log of the update operation of the current transaction to a log buffer after receiving a phase 1 prepare request message sent by a coordinator, and send a write lock advance release request to the coordinator after the writing succeeds. The write lock advance release unit 808 is configured to: release the write lock after receiving a write lock advance release response returned by the coordinator, and set a state of the current transaction in the transaction information record to releasing the write lock in advance. The first prepare response sending unit 810 is configured to: after persisting the log of the update operation of the current transaction in the log buffer succeeds, send a phase 1 prepare response message of preparation success to the coordinator after all predecessor transactions of the current transaction are in a commit state, or send a phase 1 prepare response message of preparation failure to the coordinator after any predecessor transaction of the current transaction is in an abort state. The commit-abort state unit 812 is configured to set the current transaction in the transaction information record to a commit state or an abort state based on an execution result of the current transaction in phase 2.

In an embodiment, the apparatus further includes: a second prepare response sending unit (not shown) configured to: when the current transaction has no predecessor transaction, send the phase 1 prepare response message of preparation success to the coordinator after the persisting the log of the update operation of the current transaction in the log buffer succeeds.

In an embodiment, the write lock advance release response carries a commit timestamp generated by the coordinator. The apparatus further includes: a commit timestamp writing unit (not shown) configured to record a commit timestamp of the current transaction in the transaction information record. The performing, by the update operation execution unit 802, the update operation according to the instruction includes: when a difference between a timestamp of the current update operation and a commit timestamp of the predecessor transaction of the current transaction reaches or exceeds a first threshold, performing the update operation according to the instruction after the predecessor transaction is in the commit state or the abort state.

In an embodiment, the write lock advance release response carries a commit timestamp generated by the coordinator. The apparatus further includes: a commit timestamp writing unit (not shown) configured to record a commit timestamp of the current transaction in the transaction information record. The writing, by the write lock advance release unit 808, the log of the update operation of the current transaction in the log buffer includes: when a difference between a timestamp of writing the update operation of the current transaction to the log buffer and a commit timestamp of the predecessor transaction of the current transaction reaches or exceeds a second threshold, writing the log of the update operation of the current transaction to the log buffer after the predecessor transaction is in the commit state or the abort state.

In an embodiment, the write lock advance release request carries a timestamp of writing the log of the update operation of the current transaction to the log buffer, for the coordinator to generate a commit timestamp of the current transaction.

In an embodiment, the recording, by the predecessor transaction discovery unit 804, the predecessor transaction of the current transaction in the transaction information record includes: writing each predecessor transaction of the current transaction and a status of the predecessor transaction to an entry of the current transaction in the transaction information record, and recording, in an entry of each predecessor transaction of the current transaction, the current transaction as a successor transaction of the predecessor transaction. The commit-abort state unit 812 is configured to: based on the execution result of the current transaction in a commit/abort phase, update a state in the entry of the current transaction in the transaction information record into the commit state or the abort state, and update a state of the current transaction in an entry of a successor transaction of the current transaction to the commit state or the abort state.

In an embodiment, the apparatus further includes: a predecessor transaction persistence unit (not shown) configured to persist states of the predecessor transaction of the current transaction and the current transaction in the transaction information record.

Figure 9:
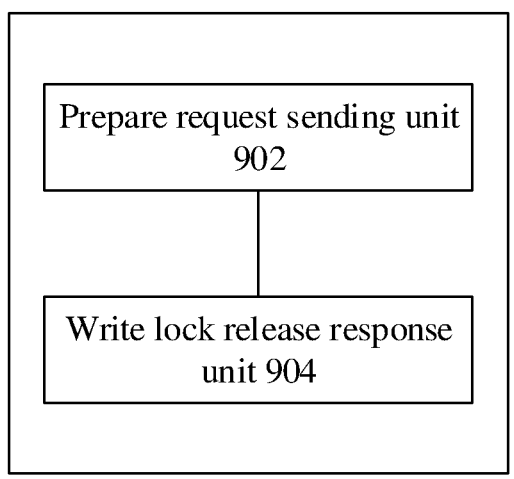
FIG. 9 is a schematic diagram of an apparatus, applied to a coordinator, for updating a database by using a two-phase commit distributed transaction according to an embodiment.

FIG. 9 is a schematic diagram of an apparatus for updating a database by using a two-phase commit distributed transaction according to an embodiment. The apparatus is applied to a coordinator, and includes a prepare request sending unit 902 and a write lock release response unit 904. The prepare request sending unit 902 is configured to send a phase 1 prepare request message to each participant to end a current transaction, the current transaction being configured to update a target database record. The write lock release response unit 904 is configured to: after receiving write lock advance release requests sent by all participants, return a write lock advance release response to each participant to instruct each participant to unlock a target database record of the participant, the write lock advance release requests being sent by the participants after the participants successfully write a log of an update operation of the current transaction to a log buffer.

In an embodiment, the apparatus further includes: a commit timestamp generation unit (not shown) configured to generate a commit timestamp of the current transaction after receiving the write lock advance release requests sent all the participants, where the write lock advance release response carries a commit timestamp of the current transaction.

In an embodiment, the write lock advance release requests carry timestamps at which the participants sending the write lock advance release requests write the log of the update operation of the current transaction to the log buffer. The generating, by the commit timestamp generation unit, the commit timestamp of the current transaction includes: using the latest timestamp in the times tamps, at which the log is written to the log buffer, in the write lock advance release requests sent by all the participants as the commit timestamp of the current transaction.

An embodiment of the present specification provides a computer device. The computer device includes a memory and a processor. The memory stores a computer program that is executable by the processor. The processor is configured to execute the stored computer program to perform the above method, applied to the participant, for updating a database by using a two-phase commit distributed transaction.

An embodiment of the present specification provides a computer device. The computer device includes a memory and a processor. The memory stores a computer program that is executable by the processor. The processor is configured to execute the stored computer program to perform the above method, applied to the coordinator, for updating a database by using a two-phase commit distributed transaction.

An embodiment of the present specification provides a non-transitory computer readable storage medium. The storage medium stores instructions that, when executed by a processor of a device, cause the device to perform the above method, applied to the participant, for updating a database by using a two-phase commit distributed transaction.

An embodiment of the present specification provides a non-transitory computer readable storage medium. The storage medium stores instructions that, when executed by a processor of a device, cause the device to perform the above method, applied to the coordinator, for updating a database by using a two-phase commit distributed transaction.

An embodiment of the present specification provides a computing device including one or more processors (CPUs), an input/output interface, a network interface, and a memory. The memory can include at least one of a non-permanent memory, a random access memory (RAM), or a non-volatile memory, such as a read-only memory (ROM) or a flash memory (flash RAM). The memory is an example of the computer readable medium.

The computer readable medium includes permanent and non-permanent media and removable and non-removable media, and information can be stored by using any method or technology. The information can be a computer readable instruction, a data structure, a program module, or other data. Examples of the computer storage medium include, but are not limited to, a phase change random access memory (PRAM), a static random access memory (SRAM), a dynamic random access memory (DRAM), another type of random access memory (RAM), a read-only memory (ROM), an electrically erasable programmable read-only memory (EEPROM), a flash memory or another memory technology, a compact disc read-only memory (CD-ROM), a digital versatile disc (DVD) or another optical storage, a magnetic cassette, a disk storage, a tape disk storage or another magnetic storage device or any another non-transmission medium, which can be configured to store information that can be accessed by the computing device. According to the definition in the present specification, the computer readable medium does not include transitory media, such as a modulated data signal and carrier.

The foregoing description is merely example embodiments of the present specification, and is not used to limit the present specification. For those skilled in the art, the present specification may have various alterations and changes. Any modifications, equivalent replacements, improvements, etc. made within the spirit and principle of the present specification shall be included in the scope of the claims.

The invention claimed is:

1. A method for updating a database by using a two-phase commit distributed transaction, the method being applied to a participant, and comprising:

performing an update operation according to an instruction on updating a target database record in a current transaction after adding a write lock to the target database record;

using a second transaction, in a transaction information record, as a predecessor transaction of the current transaction, and recording the predecessor transaction of the current transaction in the transaction information record, wherein a state of the second transaction is to release the write lock in advance and an update object of the second transaction involves the target database record;

writing a log of the update operation of the current transaction to a log buffer after receiving a first-phase prepare request message sent by a coordinator, and sending a write lock advance release request to the coordinator after the writing succeeds;

releasing the write lock after receiving a write lock advance release response returned by the coordinator, and setting a state of the current transaction in the transaction information record to releasing the write lock in advance;

after persisting the log of the update operation of the current transaction in the log buffer succeeds, performing one of: sending a first-phase prepare response message of preparation success to the coordinator after all predecessor transactions of the current transaction are in a commit state, or sending a first-phase prepare response message of preparation failure to the coordinator after any predecessor transaction of the current transaction is in an abort state; and setting the current transaction in the transaction information record to a commit state or an abort state based on an execution result of the current transaction in a second phase, wherein the recording the predecessor transaction of the current transaction in the transaction information record includes: writing each predecessor transaction of the current transaction and a status of the predecessor transaction to an entry of the current transaction in the transaction information record, and recording, in an entry of each predecessor transaction of the current transaction, the current transaction as a successor transaction of the predecessor transaction; and the setting the current transaction in the transaction information record includes: based on the execution result of the current transaction in a commit/abort phase, updating a state in the entry of the current transaction in the transaction information record into one of the commit state or the abort state, and updating a state of the current transaction in an entry of a successor transaction of the current transaction to the one of the commit state or the abort state.

2. The method according to claim 1, further comprising: when the current transaction has no predecessor transaction, sending the first-phase prepare response message of preparation success to the coordinator after the persisting the log of the update operation of the current transaction in the log buffer succeeds.

3. The method according to claim 1, wherein the write lock advance release response carries a commit timestamp generated by the coordinator;

the method further comprises: recording a commit timestamp of the current transaction in the transaction information record; and the performing the update operation according to the instruction includes: when a difference between a timestamp of the current update operation and a commit timestamp of the predecessor transaction of the current transaction reaches or exceeds a first threshold, performing the update operation according to the instruction after the predecessor transaction is in the commit state or the abort state.

4. The method according to claim 1, wherein the write lock advance release response carries a commit timestamp generated by the coordinator;

the method further comprises: recording a commit timestamp of the current transaction in the transaction information record; and the writing the log of the update operation of the current transaction to the log buffer includes: when a difference between a timestamp of writing the update operation of the current transaction to the log buffer and a commit timestamp of the predecessor transaction of the current transaction reaches or exceeds a second threshold, writing the log of the update operation of the current transaction to the log buffer after the predecessor transaction is in the commit state or the abort state.

5. The method according to claim 1, wherein the write lock advance release request carries a timestamp of writing the log of the update operation of the current transaction to the log buffer, for the coordinator to generate a commit timestamp of the current transaction.

6. The method according to claim 1, further comprising: persisting states of the predecessor transaction of the current transaction and the current transaction in the transaction information record.

7. An apparatus for updating a database by using a two-phase commit distributed transaction, the apparatus being applied to a participant, and comprising:

a processor; and a memory storing instructions executable by the processor, wherein the processor is configured to:

perform an update operation according to an instruction on updating a target database record in a current transaction after adding a write lock to the target database record;

use a second transaction, in a transaction information record, as a predecessor transaction of the current transaction, and record the predecessor transaction of the current transaction in the transaction information record, wherein a state of the second transaction is to release the write lock in advance and an update object of the second transaction involves the target database record;

write a log of the update operation of the current transaction to a log buffer after receiving a first-phase prepare request message sent by a coordinator, and send a write lock advance release request to the coordinator after the writing succeeds;

release the write lock after receiving a write lock advance release response returned by the coordinator, and set a state of the current transaction in the transaction information record to releasing the write lock in advance;

after persisting the log of the update operation of the current transaction in the log buffer succeeds, perform one of: sending a first-phase prepare response message of preparation success to the coordinator after all predecessor transactions of the current transaction are in a commit state, or sending a first-phase prepare response message of preparation failure to the coordinator after any predecessor transaction of the current transaction is in an abort state; and set the current transaction in the transaction information record to a commit state or an abort state based on an execution result of the current transaction in a second phase, wherein in recording the predecessor transaction of the current transaction in the transaction information record, the processor is further configured to: write each predecessor transaction of the current transaction and a status of the predecessor transaction to an entry of the current transaction in the transaction information record, and record, in an entry of each predecessor transaction of the current transaction, the current transaction as a successor transaction of the predecessor transaction; and in setting the current transaction in the transaction information record, the processor is further configured to: based on the execution result of the current transaction in a commit/abort phase, update a state in the entry of the current transaction in the transaction information record into one of the commit state or the abort state, and update a state of the current transaction in an entry of a successor transaction of the current transaction to the one of the commit state or the abort state.

8. The apparatus according to claim 7, wherein the processor is further configured to:

when the current transaction has no predecessor transaction, send the first-phase prepare response message of preparation success to the coordinator after the persisting the log of the update operation of the current transaction in the log buffer succeeds.

9. The apparatus according to claim 7, wherein the write lock advance release response carries a commit timestamp generated by the coordinator; and the processor is further configured to:

record a commit timestamp of the current transaction in the transaction information record; and when a difference between a timestamp of the current update operation and a commit timestamp of the predecessor transaction of the current transaction reaches or exceeds a first threshold, perform the update operation according to the instruction after the predecessor transaction is in the commit state or the abort state.

10. The apparatus according to claim 7, wherein the write lock advance release response carries a commit timestamp generated by the coordinator; and the processor is further configured to:

record a commit timestamp of the current transaction in the transaction information record; and when a difference between a timestamp of writing the update operation of the current transaction to the log buffer and a commit timestamp of the predecessor transaction of the current transaction reaches or exceeds a second threshold, write the log of the update operation of the current transaction to the log buffer after the predecessor transaction is in the commit state or the abort state.

11. The apparatus according to claim 7, wherein the write lock advance release request carries a timestamp of writing the log of the update operation of the current transaction to the log buffer, for the coordinator to generate a commit timestamp of the current transaction.

12. The apparatus according to claim 7, wherein the processor is further configured to:

persist states of the predecessor transaction of the current transaction and the current transaction in the transaction information record.

\* \* \* \* \*